United States Patent
Hemming et al.

(10) Patent No.: US 6,748,639 B2
(45) Date of Patent: Jun. 15, 2004

(54) METHOD FOR PRODUCING A DISPENSING DEVICE FOR PRODUCTS THAT CAN BE SPREAD EASILY

(75) Inventors: Christian Hemming, Oberhausen (DE); Bernd Peters, Solingen (DE); Werner Hoeve, Oss (NL)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 10/446,033

(22) Filed: May 27, 2003

(65) Prior Publication Data

US 2003/0201577 A1 Oct. 30, 2003

Related U.S. Application Data

(63) Continuation of application No. PCT/EP01/13308, filed on Nov. 17, 2001.

(30) Foreign Application Priority Data

Nov. 25, 2000 (DE) .......................... 100 58 673

(51) Int. Cl.⁷ ................................ B23P 17/00
(52) U.S. Cl. ......................... 29/413; 29/412
(58) Field of Search .................. 29/412, 413, 428, 29/417; 264/328.1, 152

(56) References Cited

U.S. PATENT DOCUMENTS

5,581,980 A 12/1996 Halm
5,661,889 A * 9/1997 Valyi ........................... 29/416

FOREIGN PATENT DOCUMENTS

EP  0 940 103 A1  9/1999
FR  2 673 517  9/1992

OTHER PUBLICATIONS

R. Pye, "Assembling Parts In the Mold", Modern Plastics, McGraw–Hill, Inc. Lausanne, Ch., vol. 47, No. 7, pp. 90, 91, 92 and 94 (Jul. 1 1970) XP002052171.

* cited by examiner

Primary Examiner—John C. Hong
(74) Attorney, Agent, or Firm—Stephen D. Harper; Glenn E. J. Murphy

(57) ABSTRACT

A method of producing a dispensing device for coatable products, such as adhesives, wherein a sleeve-shaped element, a pedestal with a spindle, a piston for receiving the product, and a closure cap are produced by injection moulding, and the thus-produced parts are subsequently assembled, comprising the steps of injection-moulding the piston and the spindle together as a single body in a common injection-moulding process, wherein the piston and spindle are formed to be separable for assembly after injection-moulding.

5 Claims, 1 Drawing Sheet

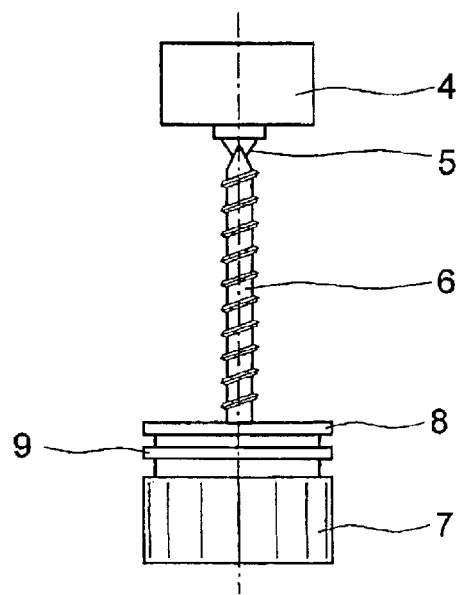
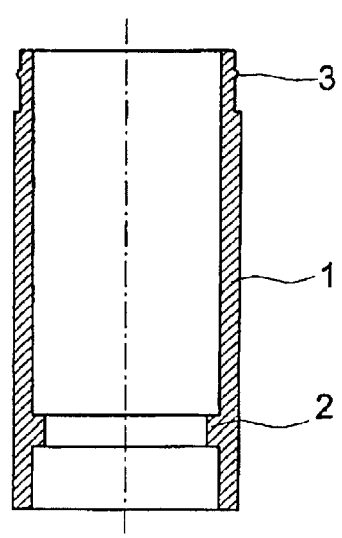
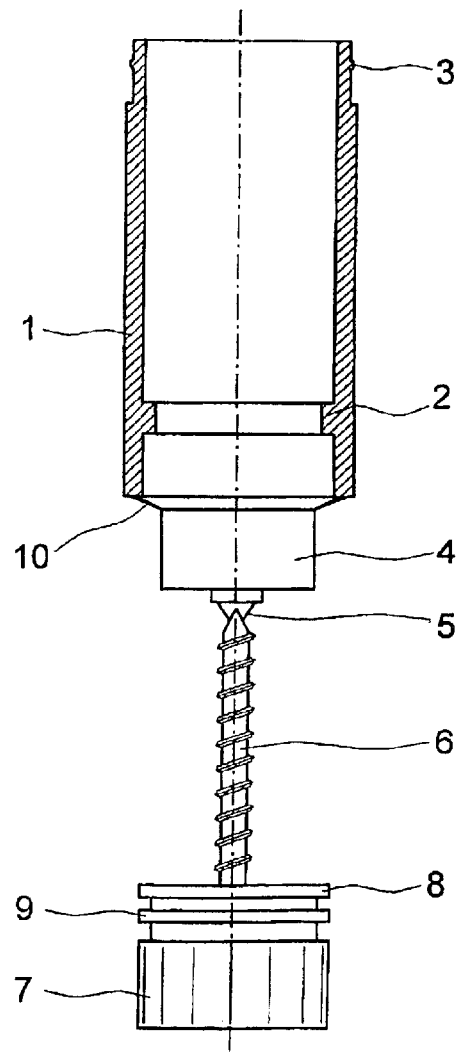
Fig. 1          Fig. 2

METHOD FOR PRODUCING A DISPENSING DEVICE FOR PRODUCTS THAT CAN BE SPREAD EASILY

CROSS-REFERENCE TO RELATED APPLICATIONS

This application is a continuation application under 35 U.S.C. § 365(c) of international application PCT/EP01/13308, filed in the European Patent Office on Nov. 17, 2001, and claims priority under 35 U.S.C. § 119 of application DE 100 58 673.2, filed Nov. 25, 2000, in the German Patent Office.

BACKGROUND OF THE INVENTION

The invention relates to a method for producing a dispensing device for coatable products, such as adhesive materials, in which a sleeve-shaped element, a pedestal with a spindle, a piston for receiving the product, and a closure cap are produced by injection moulding, and the thus-produced parts are subsequently assembled, wherein the piston is moulded to the spindle in a common injection-moulding process, and the piston and spindle are made to be separable after injection-moulding.

Dispensing devices of this kind, particularly for adhesive materials, i.e. so-called glue sticks, are represented in great numbers in the market. They usually consist of at least a sleeve-shaped element, a pedestal with a spindle, a piston for receiving adhesive material, and a closure cap. These components are each produced from suitable plastic material by injection moulding and are subsequently put together or assembled. The four components have to be individually movable relative to one another when assembled. The production cost for dispensing devices of this kind is obviously considerable, since a total of four different injection-moulding moulds are required for production of the four basic components, and correspondingly four respective injection-moulding processes are required. Moreover, assembly is also relatively costly, since all four components have to be fastened to another. Since the injection-moulding costs and the assembly costs represent the main part of the overall costs for dispensing devices of this kind, this form of manufacture is deserving of improvement.

A method for producing a dispensing device for easily spreadable products is known from EP-A-0 940 103, in which a sleeve-shaped element, a pedestal with a spindle, a piston for receiving the product, and a closure cap are produced by injection moulding, and the thus-produced parts are subsequently assembled. In this process the piston is moulded to the spindle in a common injection-moulding process and remains rigidly connected with the spindle in the assembled actuating setting of the dispensing device. Relative movement between piston and spindle is not possible. However, in the case of glue sticks, a relative movement of piston and threaded spindle has to be possible in order to be able to dispense adhesive.

It is the object of the invention to simplify the production and assembly of dispensing devices of that kind for coatable products. According to the invention this object is met by a method, of the kind described in the introduction, in which the piston is injection-moulded to the spindle such that the two components are separable after moulding.

DESCRIPTION OF THE INVENTION

In the method of the invention, one injection-moulding process and one tool are made redundant in comparison to the conventional mode of production, since the piston is injection-moulded directly to the spindle to form a single body of two separable parts. The connection between piston and spindle can be selected so that the piston and spindle can be separated in a simple manner after the injection-moulding process. In one embodiment, the piston is positioned on the spindle by rotation during assembly, whereby the connection between piston and spindle is destroyed. Thus, assembly also can be simplified substantially.

In order to simply assembly further, it is advantageous to connect the piston to the spindle by frangible, injection-moulded locations. It is then possible in simple manner to destroy the frangible locations by rotating the piston on the spindle. In that case, either the piston together with spindle and socket that are injection-moulded thereon can be knocked into the sleeve-shaped element and subsequently the piston screwed onto the spindle by destroying the frangible locations, or the piston can be initially screwed onto the spindle by destroying the frangible locations and then the thus-formed unit knocked into the sleeve-shaped element.

The production cost can be still further reduced if the spindle and piston are injection-moulded to the sleeve-shaped element in a common injection-moulding process. Here, too, the connection between the components in the common injection-moulding process can be selected so that this can be easily destroyed. In this embodiment at least one more injection-moulding tool is made redundant, whereby moulding cost is still further reduced, as well as assembly cost. This result is achieved advantageously by injection-moulding the spindle, piston, and sleeve-shaped element together by way of frangible locations connecting the parts.

BRIEF DESCRIPTION OF THE DRAWINGS

The invention is explained in more detail, by way of example, in the following by reference to the drawings, in which:

FIG. 1 shows a first embodiment of the invention in an exploded illustration; and FIG. 2 shows a second embodiment of the invention, similarly in exploded illustration.

A first embodiment of the method according to the invention for producing a dispensing device for coatable products, such as adhesive material, is illustrated in FIG. 1. In this embodiment a sleeve-shaped element 1 is produced in the usual manner by injection-moulding from a suitable plastics material; this sleeve-shaped element 1 in that case preferably has an inner detent bead 2 and, at the free end at the top, an encircling, external detent bead 3 for attachment of a closure cap which is not illustrated, this closure cap similarly being produced in an individual injection-moulding process.

According to the invention it is now provided that a piston 4, which later receives the coatable mass, is injection-moulded in a single injection-moulding process to a spindle 6 with a pedestal 7 by way of frangible locations or retaining webs 5. The pedestal 7 in addition has, in usual manner, a detent bead 8.

It is evident that for production of the aforesaid components only two injection-moulding processes or three injection-moulding processes are necessary (the third for the production of the closure cap which is not illustrated). Assembly then takes place in the following manner:

After insertion of a seal 9 between the pedestal 7 and the detent bead 8, the subassembly which consists of piston 4, spindle 6 and pedestal 7 and which is initially moulded integrally and in one injection-moulding process, is knocked from below into the sleeve-shaped element 1 so that the detent bead 8 comes into detenting contact with the detent bead 2. Subsequently, the piston 4 is rotated relative to the spindle 6, whereby the retaining webs 5 or frangible locations break off and the piston 4 can be screwed completely onto the spindle 6. Alternatively, it is also possible to firstly rotate the piston 4 relative to the spindle 6, whereby the retaining webs 5 break off. The piston 4 is then turned completely into the lowermost assembly position on the spindle 6. The thus-obtained assembly group is then knocked into the sleeve-shaped element 1.

The coatable mass can then be cast in the device assembled together in one of the two ways. It is thus evident that not only manufacture, but additionally also assembly of the dispensing device is substantially simplified by the method of procedure according to the invention.

In the case of the embodiment according to FIG. 2 only a single injection-moulding process is necessary for production of the components consisting of piston 4, spindle 6 with pedestal 7, and sleeve-shaped element 1, because the spindle 6, together with the pedestal 7, and the piston 4 are injection-moulded to the sleeve-shaped element 1 in a common injection-moulding process, preferably by way of retaining webs 10 formed as frangible locations. A further injection-moulding process is then required only for production of the closure cap.

Assembly is carried out in principle in the same manner as in the embodiment according to FIG. 1; it is merely necessary to initially overcome the frangible locations 10 between the piston 4 and the sleeve-shaped element 1.

The invention is obviously not restricted to the illustrated embodiments. Further embodiments are possible without departing from the basic concept. Thus, in principle the closure cap could also be injection-moulded to the sleeve-shaped element 1 by way of frangible locations.

What is claimed is:

1. A method of producing a dispensing device for coatable products, wherein a sleeve-shaped element (1), a pedestal (7) with a spindle (6), a piston (4) for receiving a coatable product, and a closure cap are produced by injection moulding and the thus-produced parts are subsequently assembled, comprising the steps of injection-moulding the piston (4) and the spindle (6) together as a single body in a common injection-moulding process, wherein the piston and spindle are formed to be separable for assembly after injection-moulding.

2. The method of claim 1, wherein after injection-moulding the piston (4) is connected to the spindle (6) by one or more frangible locations (5).

3. The method of claim 1, wherein the spindle 96), the piston (4), and the sleeve-shaped element (1) are injection moulded together as a single body in a common injection-moulding process.

4. The method of claim 2, wherein the spindle (6), the piston (4), and the sleeve-shaped element (1) are injection moulded together as a single body in a common injection-moulding process.

5. The method of claim 4, wherein after injection-molding the spindle (6), the piston (4), and sleeve-shaped element (1) are connected by way of frangible locations (10).

* * * * *